(12) United States Patent
Takami

(10) Patent No.: US 6,765,753 B2
(45) Date of Patent: Jul. 20, 2004

(54) DISK APPARATUS

(75) Inventor: Hiromichi Takami, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/348,766

(22) Filed: Jan. 23, 2003

(65) Prior Publication Data
US 2003/0169532 A1 Sep. 11, 2003

(30) Foreign Application Priority Data
Mar. 8, 2002 (JP) .................................. 2002-064024

(51) Int. Cl.$^7$ .......................................... G11B 33/14
(52) U.S. Cl. ...................................................... 360/97.02
(58) Field of Search .......................... 360/97.01, 97.02, 360/97.03

(56) References Cited

U.S. PATENT DOCUMENTS 4,831,476 A * 5/1989 Branc et al. ............. 360/97.02
4,939,469 A * 7/1990 Ludwig et al. ............. 324/694

FOREIGN PATENT DOCUMENTS

| JP | 7-14378 | 1/1995 |
| JP | 2000-189789 | 7/2000 |

* cited by examiner

Primary Examiner—George J. Letscher
(74) Attorney, Agent, or Firm—Pillsbury Winthrop LLP

(57) ABSTRACT

A moisture absorbing agent is used in a disk apparatus. The difference in the moisture absorption amount in the hygroscopic isothermal line between the moisture absorbing agent at a relative humidity of 80% and the moisture absorbing agent at a relative humidity of 95% is not less than 30% in the moisture absorbing stage and is not less than 20% in the moisture releasing stage relative to the dry weight of the moisture absorbing agent.

8 Claims, 7 Drawing Sheets

DISK APPARATUS

CROSS-REFERENCE TO RELATED APPLICATIONS

This application is based upon and claims the benefit of priority from the prior Japanese Patent Application No. 2002-64024, filed Mar. 8, 2002, the entire contents of which are incorporated herein by reference.

BACKGROUND OF THE INVENTION

1. Field of the Invention

The present invention relates to a disk apparatus for reading a magnetic disk or an optical disk, and to a condensation preventing member used in the disk apparatus.

2. Description of the Related Art

Known disk apparatuses includes for example, a magnetic disk apparatus such as a hard disk drive and an optical disk apparatus such as a CD-R drive.

For example, a magnetic disk apparatus comprises constituting parts such as a magnetic disk, a magnetic disk driving mechanism, a recording-reading magnetic head, and a carriage assembly, which are arranged compact within a base body, and a lid body covering the base body. In the magnetic disk apparatus of the particular construction, the magnetic head is allowed to float on the magnetic disk that is rotated at high speed so as to carry out the recording and reading of information. If the base body and the lid body are hermetically sealed so as to permit the constituting parts noted above to be completely shielded from the outer atmosphere, an undesirable change in the gaseous pressure, which gives rise to an inconvenience in the floating of the magnetic head, is generated in the vicinity of the magnetic disk rotated at high speed. Therefore, air passageways sized and constructed not to permit, for example, dust to enter the base body are formed in advance in the base body so as to introduce the outer air into the base body in an amount large enough to achieve floating of the magnetic head. However, since the outer air is introduced into the base body, the magnetic disk apparatus is likely to be affected by the environment so as to bring about a change in the humidity within the magnetic disk apparatus. If the humidity within the magnetic disk apparatus is increased, the magnetic head tends to be drawn to the surface of the magnetic disk, with the result that it is impossible for the magnetic head to float stably on the magnetic disk. On the other hand, if the humidity within the magnetic disk apparatus is low, static electricity tends to be generated within the magnetic disk apparatus. It should be noted that, if an excessively large current flows electrostatically through the MR or GMR element generally used in a magnetic disk, an electrostatic rupture tends to take place. In each of these cases, a problem is generated that it is difficult to achieve an accurate magnetic recording-reading operation.

Under the circumstances, the magnetic disk apparatus is constructed in general such that, in order to control the humidity within the base body so as to prevent condensation and electrostatic rupture, a filter or a patch housing a moisture absorbing agent is housed in the base body.

Proposed in, for example, Jpn. Pat. Appln. KOKAI Publication No. 7-14378 is a magnetic disk apparatus equipped with a so-called "highly hygroscopic resin", i.e., a moisture absorbing agent whose moisture absorbing characteristics are increased with increase in the humidity and with a so-called "A type silica gel", i.e., a moisture absorbing agent whose moisture absorbing characteristics decrease as the humidity increases. In this prior art, two kinds of moisture absorbing agents noted above are used such that the highly hygroscopic resin performs its function at high humidity so as to prevent the high humidity and the A type silica gel releases moisture at low humidity so as to prevent the low humidity. In this fashion, a change in the humidity within the apparatus is suppressed over a long period.

In the prior art quoted above, however, the hygroscopic characteristics of the moisture absorbing agent used are particularly high. Where a temperature-humidity cycle test was conducted, the moisture absorbed by the moisture absorbing agent was not released sufficiently, with the result the moisture absorbing capability of the moisture absorbing agent was gradually reduced with time. In other words, the prior art quoted above gives rise to the problem that, even if the moisture absorbing agent is arranged, the humidity within the magnetic disk apparatus is increased if the temperature-humidity cycle is repeated.

BRIEF SUMMARY OF THE INVENTION

An embodiment of the present invention, which has been achieved in an attempt to overcome the above-noted problem inherent in the prior art, may provide a disk apparatus having a long life and high reliability, which uses a moisture absorbing agent capable of effectively suppressing the change in humidity within the disk apparatus so as to prevent malfunction caused by the condensation.

According to a first aspect of the present invention, there is provided a disk apparatus, comprising:

a base body;

a disk medium, a driving mechanism for supporting and rotating the disk medium, a head equipped with an element for reading the information recorded in the disk medium, a carriage assembly supporting the head in a manner to be movable relative to the disk medium, and a condensation preventing member, which are placed on the base body; and a lid body covering the base body;

wherein the condensation preventing member contains a moisture absorbing agent exhibiting a different moisture absorption amount depending on the humidity, the difference in the moisture absorption amount in its hygroscopic isothermal line between the moisture absorbing agent at a relative humidity of 80% and the moisture absorbing agent at a relative humidity of 95% being not less than 30% in the moisture absorbing stage and not less than 20% in the moisture releasing stage based on the dry weight of the moisture absorbing agent.

According to a second aspect of the present invention, there is provided a disk apparatus, comprising:

a base body;

a disk medium, a driving mechanism for supporting and rotating the disk medium, a head equipped with an element for reading information recorded on the disk medium, a carriage assembly supporting the head in a manner to be movable relative to the disk medium, and a condensation preventing member, which are placed on the base body; and a lid body covering the base body;

wherein the condensation preventing member contains a moisture absorbing agent including at least first and second components each exhibiting a different moisture absorption amount depending on the humidity;

the difference in the moisture absorption amount in its hygroscopic isothermal line between the first component of the moisture absorbing agent at a relative humidity of 80% and the first component of the moisture absorbing agent at a relative humidity of 95% is not less than 30% in the moisture absorbing stage and not less than 20% in the moisture releasing stage based on the dry weight of the first component of the moisture absorbing agent; and the difference in the moisture absorption amount in its hygroscopic isothermal line between the second component of the moisture absorbing agent at a relative humidity of 40% and the second component of the moisture absorbing agent at a relative humidity of 65% is not less than 20% in the moisture absorbing stage based on the dry weight of the second component of the moisture absorbing agent, and the difference in the moisture absorption amount between the second component of the moisture absorbing agent at a relative humidity of 20% and the second component of the moisture absorbing agent at a relative humidity of 50% is not less than 20% in the moisture releasing stage based on the dry weight of the second component of the moisture absorbing agent.

Additional embodiments and advantages of the present invention will be set forth in the description which follows, and in part will be obvious from the description, or may be learned by practice of the present invention. The embodiments and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

Figure 1:
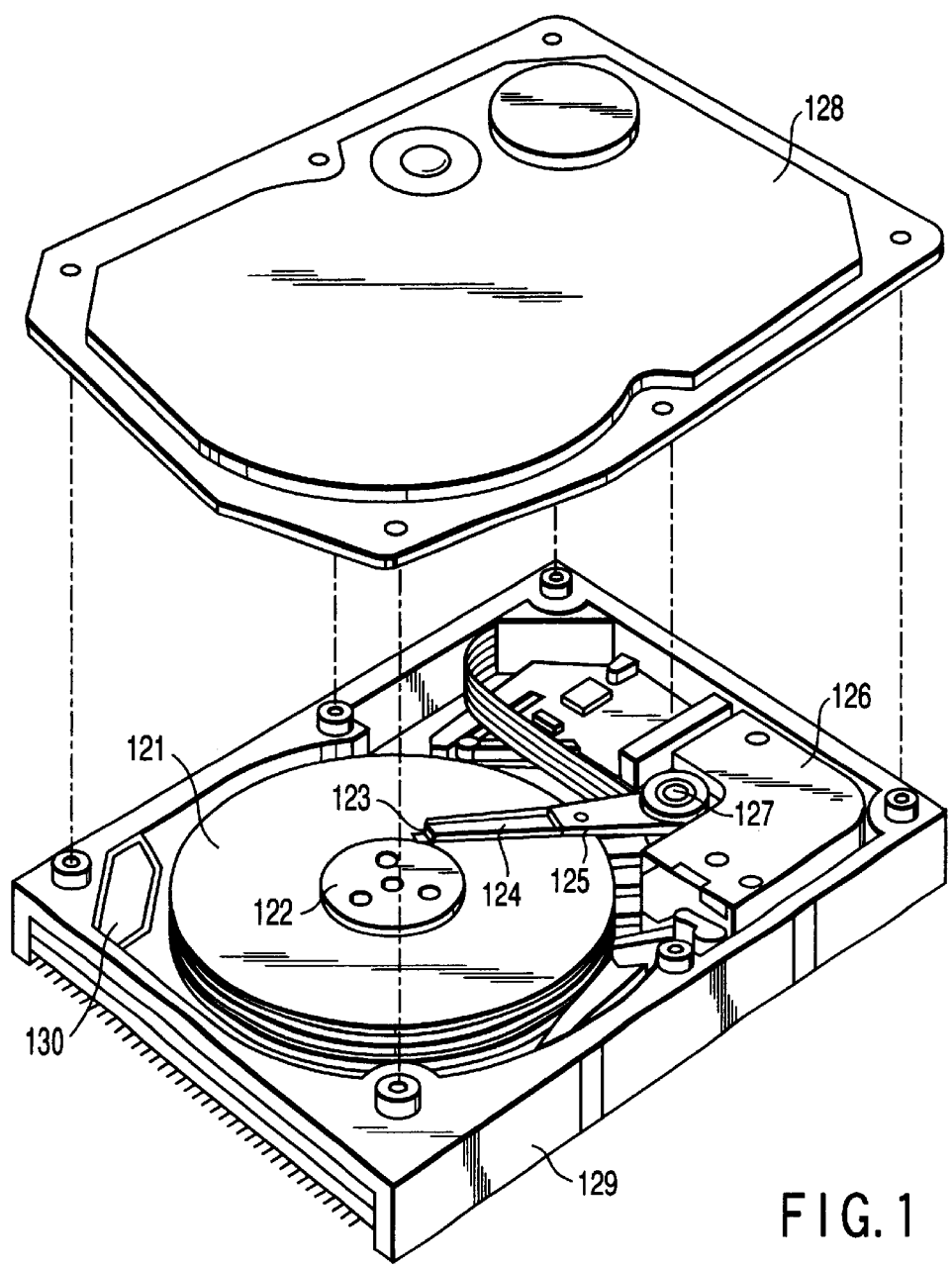
FIG. 1 is an oblique view schematically showing as an example the construction of a disk apparatus of one embodiment of the present invention.

The disk apparatus of the present invention comprises basically a base body, a lid body covering the base body, and constituting parts housed in the base body. The constituting parts include a disk medium, a driving mechanism supporting and rotating the disk medium, a head equipped with a reading element for reading information recorded on, at least, the disk medium, a carriage assembly supporting the head in a manner to be movable relative to the disk medium, and a condensation preventing member containing a moisture absorbing agent.

Also, in the disk apparatus of the present invention, air passageways sized and constructed not to permit, for example, dust to enter the base body are formed in at least one of the base body and the lid body.

Further, the head should desirably be a floating type head.

In the disk apparatus according to the first aspect of the present invention, the moisture absorbing agent contained in the condensation preventing member exhibits a different moisture absorption amount depending on the humidity of the atmosphere in which the moisture absorbing agent is placed such that the difference in the moisture absorption amount in its hygroscopic isothermal line between the moisture absorbing agent at a relative humidity of 80% and the moisture absorbing agent at a relative humidity of 95% is at least 30% in the moisture absorbing stage and at least 20% in the moisture releasing stage relative to the dry weight of the moisture absorbing agent.

According to the first aspect of the present invention, use is made of a moisture absorbing agent exhibiting a difference in the moisture absorption amount in its hygroscopic isothermal line such that the difference in the moisture absorption amount between the moisture absorbing agent at a relative humidity of 80% and the moisture absorbing agent at a relative humidity of 95% is at least 30% in the moisture absorbing stage and at least 20% in the moisture releasing stage based on the dry weight of the moisture absorbing agent. By using the particular moisture absorbing agent, it is possible to absorb sufficiently the moisture in an atmosphere having a relative humidity of at least 80% and to release sufficiently the moisture in an atmosphere having a humidity less than 80%. The moisture absorbing capability of the moisture absorbing agent is not lowered even if the temperature-humidity cycle is repeated, with the result that it is possible to prevent the humidity within the apparatus from being increased over a long period by using a small amount of the moisture absorbing agent. It follows that it is possible to prevent the inconveniences caused by a change in humidity such as condensation at high humidity and the generation of a static electricity at low humidity. As a result, it is possible to avoid the electrostatic rupture of the head and to maintain the floating state of the head with a high stability so as to make it possible to obtain a disk apparatus free from malfunction, high in reliability and having a long life.

If the difference in the amount of the moisture absorption between the moisture absorbing agent at a relative humidity of 80% and the moisture absorbing agent at a relative humidity of 95% is less than 30% in the moisture absorbing stage relative to the dry weight of the moisture absorbing agent, the amount of the moisture absorbed by the moisture absorbing agent tends to be decreased when the environmental humidity is changed from low humidity to high humidity not less than 90% so as to bring about a condensation. On the other hand, if the difference in the moisture absorption amount noted above is smaller than 20% in the moisture releasing stage, the amount of the moisture released from the moisture absorbing agent tends to be lowered when the environmental temperature is lowered, with the result that the moisture absorption capability of the moisture absorbing agent tends to fail to be restored.

It is more desirable for the difference in the amount of the moisture absorption between the moisture absorbing agent at a relative humidity of 80% and the moisture absorbing agent at a relative humidity of 95% to be at least 50% in the moisture absorbing stage and to be at least 30% in the moisture releasing stage. In this case, it is possible to obtain a high moisture absorption effect by using a small amount of the moisture absorbing agent so as to prevent effectively the inconveniences caused by a change in humidity. It follows that it is possible to obtain a disk apparatus high in reliability and long in life.

Incidentally, the hygroscopic isothermal line, which represents a graph denoting the relationship between the relative humidity and the moisture absorption amount at a prescribed temperature, is one of the indexes denoting the characteristics of the moisture absorbing agent.

The disk apparatus according to the second aspect of the present invention comprises the basic construction equal to that of the disk apparatus according to the first aspect of the present invention described above. In addition, the moisture absorbing agent used in the disk apparatus according to the second embodiment of the present invention includes first and second components each exhibiting a different moisture absorption amount depending on the humidity.

The difference in the moisture absorption amount in its hygroscopic isothermal line between the first component of the moisture absorbing agent at a relative humidity of 80% and the first component of the moisture absorbing agent at a relative humidity of 95% is not less than 30% in the moisture absorbing stage and not less than 20% in the moisture releasing stage based on the dry weight of the first component of the moisture absorbing agent.

On the other hand, the difference in the moisture absorption amount in its hygroscopic isothermal line between the second component of the moisture absorbing agent at a relative humidity of 40% and the second component of the moisture absorbing agent at a relative humidity of 65% is not less than 20% in the moisture absorbing stage based on the dry weight of the second component of the moisture absorbing agent, and the difference in the moisture absorption amount between the second component of the moisture absorbing agent at a relative humidity of 20% and the second component of the moisture absorbing agent at a relative humidity of 50% is not less than 20% in the moisture releasing stage based on the dry weight of the second component of the moisture absorbing agent.

In the technology according to the second aspect of the present invention, the first and second components of the moisture absorbing agents are used together so as to make it possible to absorb the moisture sufficiently in a high humidity environment having a relative humidity of 80% or more and to release the moisture sufficiently in a low humidity environment having a humidity not more than 65%. As a result, it is possible to prevent effectively not only the elevation of the humidity but also the decrease the humidity within the apparatus. It follows that it is possible to prevent the condensation under a high humidity environment and the generation of the static electricity in a low humidity environment so as to make it possible to obtain a disk apparatus free from malfunction and high in reliability while avoiding the electrostatic rupture of the head and maintaining a stable floating state of the head.

If the difference in the amount of the humidity absorption between the first component of the moisture absorbing agent at a relative humidity of 80% and the first component of the humidity absorbing agent at a relative humidity of 95% is smaller than 30% in the moisture absorbing stage, the amount of the moisture absorbed by the moisture absorbing agent is small when the environmental moisture is changed from the low humidity state to the high humidity state having a relative humidity of 90% or more, with the result that the condensation tends to take place. If the difference noted above is smaller than 20% in the moisture releasing stage, the amount of the moisture released from the moisture absorbing agent when the environmental temperature is lowered is decreased, with the result that the moisture absorption capability of the moisture absorbing agent tends to fail to be restored.

If the difference in the moisture absorption amount between the second component of the moisture absorbing agent at a relative humidity of 40% and the second component of the moisture absorbing agent at a relative humidity of 65% is smaller than 20% relative to the dry weight of the moisture absorbing agent in the moisture absorbing stage, it is impossible to maintain sufficiently the moisture released from the moisture absorbing agent when the humidity is reduced. On the other hand, if the difference in the moisture absorption amount between the second component of the moisture absorbing agent at a relative humidity of 20% and the second component of the moisture absorbing agent at a relative humidity of 50% is less than 20% in the moisture releasing stage relative to the dry weight of the moisture absorbing agent, the moisture absorbing agent tends to fail to release the moisture sufficiently when the humidity is reduced.

It is desirable for the weight ratio of the first component to the second component of the moisture absorbing agent to fall within a range of between 3:1 and 1:3. If the weight ratio fails to fall within the range noted above, the component of the moisture absorbing agent mixed in an insufficient amount tends to fail to produce its effect sufficiently.

The present invention will now be described more in detail with reference to the accompanying drawings.

FIG. 1 is an oblique view schematically showing as an example the construction of a disk apparatus of the present invention. In the magnetic recording-reading apparatus shown in the drawing, various constituting parts are housed in a base body 129.

Specifically, a magnetic disk 121 of a rigid construction for recording information is mounted on a spindle 122 and rotated at a prescribed rotating speed by a spindle motor (not shown). A slider 123 gaining access to the magnetic disk 121 for performing recording-reading of information is mounted on the tip of a suspension 124 made of a thin plate-like leaf spring. The suspension 124 is connected to one end of an arm 125 having, for example, a bobbin portion for holding a driving coil (not shown).

A voice coil motor, which is a kind of a linear motor, is mounted on the other end of the arm 125. The voice coil motor comprises a driving coil (not shown) wound about the bobbin portion of the arm 125 and a magnetic circuit consisting of a permanent magnet and a counter yoke arranged to have the driving coil interposed therebetween.

The arm 125 is held by ball bearings (not shown) arranged in upper and lower portions of a stationary shaft 127 and swung by the voice coil motor 126. In other words, the position of the slider 123 on the magnetic disk 121 is controlled by the voice coil motor 126.

A condensation preventing member 130 including a moisture absorbing agent and a member housing the moisture absorbing agent is arranged in a part of the inner wall of the base body 129 such that the condensation preventing member 130 is positioned apart from the magnetic disk 121.

It is possible for the condensation preventing member 130 to be arranged in any region of the space partitioned by a lid body 128 and the base body 129. For example, it is possible to arrange the condensation preventing member 130 on the back surface of the lid body 128 or in the inner wall of the base body 129. Preferably, the position of the condensation preventing member 130 is selected in a manner to avoid obstruction of the magnetic recording-reading operation.

Figure 2:
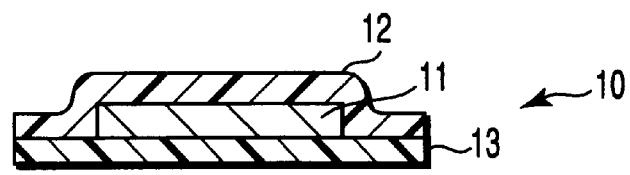
FIG. 2 is a cross-sectional view exemplifying the construction of a condensation preventing member used in the embodiment.

FIG. 2 is a cross-sectional view exemplifying the construction of the condensation preventing member 130. As shown in the drawing, the condensation preventing member 130 comprises a moisture absorbing agent 11 and a gas permeable film 12 and a base film 13 collectively sealing the moisture absorbing agent 11 such that the moisture absorbing agent 11 is not diffused into the magnetic recording-reading apparatus and, thus, dust is not generated within the magnetic recording-reading apparatus.

Figure 3:
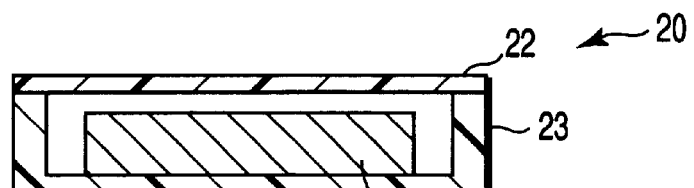
FIG. 3 is a cross-sectional view showing another example of the construction of a condensation preventing member used in the embodiment.

FIG. 3 is a cross-sectional view showing another example of the construction of the condensation preventing member. In this case, the condensation preventing member 20 comprises a moisture absorbing agent 21 housed in a plastic container 23 and a gas permeable film 22 sealing the open end of the plastic container 23.

It is possible to use, for example, Gore-Tex, which permits a water vapor to permeate therethrough easily, for forming the gas permeable film.

Figure 4:
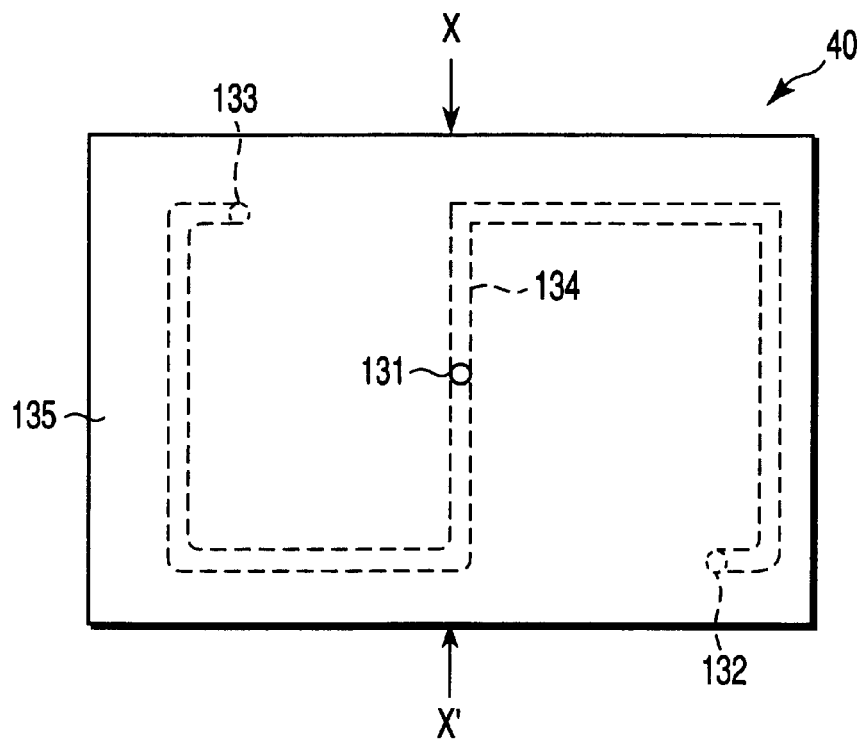
FIG. 4 is a bottom view of the condensation preventing member used in the disk apparatus of the embodiment shown in FIG. 3.
Figure 5:
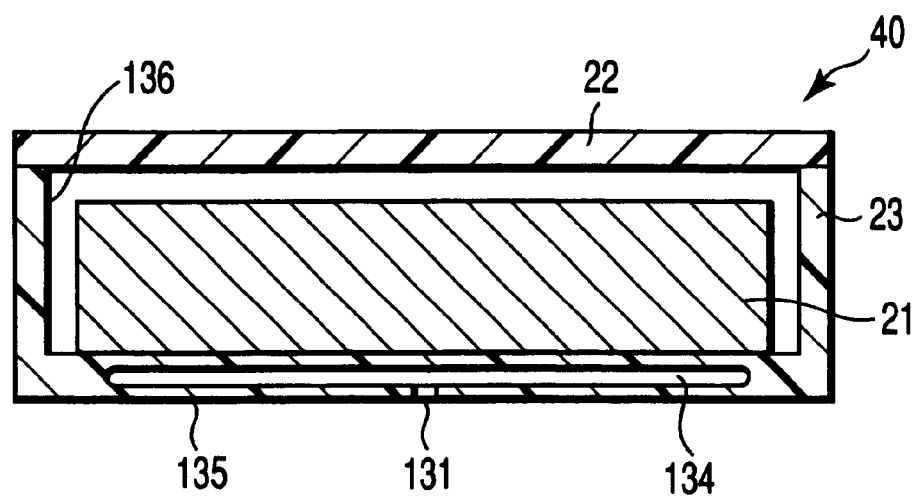
FIG. 5 is a cross-sectional view along the line X–X' shown in FIG. 4.

FIG. 4 shows the other example of the condensation preventing member, as viewed from the bottom, and FIG. 5 is a cross-sectional view along the line X–X' shown in FIG. 4.

As shown in FIGS. 4 and 5, the condensation preventing member 40 used in the disk apparatus of the present invention includes an air communicating hole 131 having a diameter of about 1 mm and formed in the center on the outer surface 135 of the bottom portion of the condensation preventing member 40, an air passageway 134 communicating with the air communicating hole 131 and formed in two portions in the bottom portion of the condensation preventing member 40, and two air communicating holes 132 and 133 in which the both end portions of the air passageway 134 are open to an inner surface 136 in the bottom portion of the condensation preventing member 40. The condensation preventing member 40 used in the present invention is constructed such that a sufficiently large distance is provided between the fine air communicating hole 131 formed on the outer surface 135 in the bottom portion and the fine air communicating hole 132 formed on the inner surface 136 in the bottom portion of the condensation preventing member 40, and the air passageway 134 is formed between these fine air communicating holes 131 and 132, thereby preventing the entry of, for example, dust into the inner region of the disk apparatus. It is possible to use optionally another member such as a dust preventing filter in combination with the construction described above. It is also possible to arrange a plurality of moisture absorbing members within the disk apparatus. For example, it is possible to attach the moisture absorbing member 10 shown in FIG. 2 to the back surface of the lid body 128 and to attach the moisture absorbing member 20 shown in FIG. 3 or the moisture absorbing member 40 shown in FIG. 4 and FIG. 5 to the inner wall of the base body 129.

Figure 6:
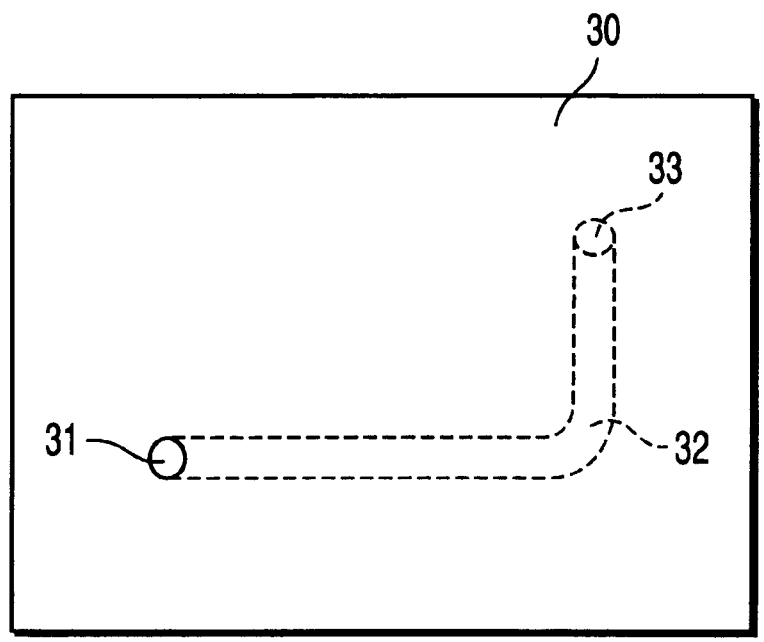
FIG. 6 is a bottom view showing another example of the construction of the condensation preventing member used in the embodiment.

FIG. 6 shows as another example the construction of a condensation preventing member 30 shown in FIGS. 4 and 5, as viewed from the bottom surface. As shown in the drawing, the condensation preventing member 30 includes an air communicating hole 31 formed on the outer surface in the bottom portion of the condensation preventing member 30, an air passageway 32 communicating with the air communicating hole 31, and another air communicating hole 33 open to the inner surface in the bottom portion of the condensation preventing member 30.

The disk apparatus described above is no more than an example. Of course, the present invention is not limited to the disk apparatus described above.

EXAMPLES

The present invention will now be described in more detail with reference to some examples of the present invention.

First of all, prepared were moisture absorbing agents A, B, C, D, E and F.

Figure 7:
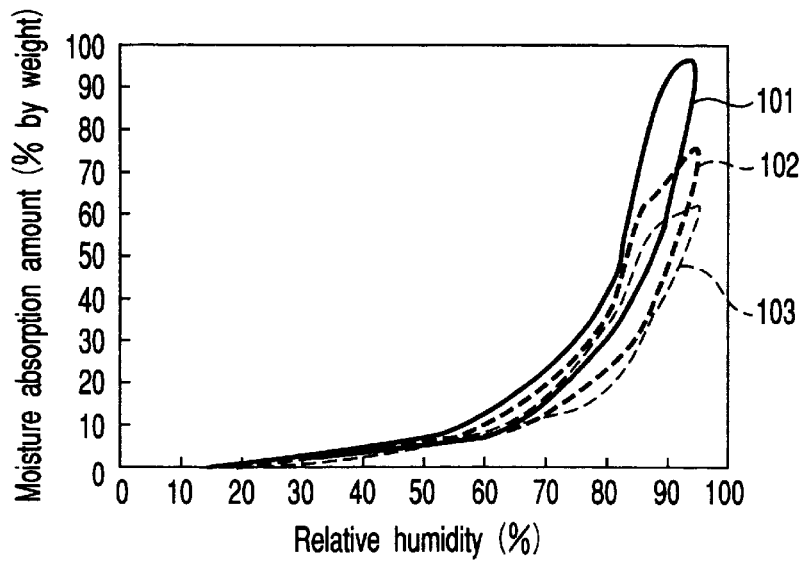
FIG. 7 is a graph showing the hygroscopic isothermal lines of moisture absorbing agents A, B and C.

FIG. 7 is a graph showing the hygroscopic isothermal line at 25° C. for each of moisture absorbing agents A, B and C. Curves 101, 102 and 103 shown in the graph are directed to moisture absorbing agents A, B and C, respectively.

Figure 8:
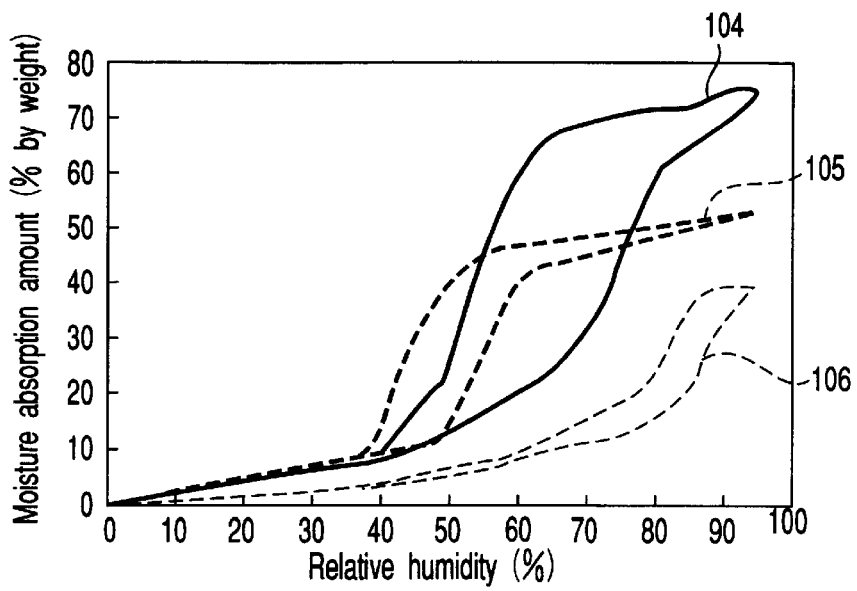
FIG. 8 is a graph showing the hygroscopic isothermal lines of moisture absorbing agents D, E and F.

On the other hand, FIG. 8 is a graph showing the hygroscopic isothermal line for each of moisture absorbing agents D, E and F. Curves 104, 105 and 106 shown in the graph are directed to moisture absorbing agents D, E and F, respectively.

Table 1 shows the difference in the moisture absorption amount in the hygroscopic isothermal line between the moisture absorbing agent at a relative humidity of 80% and the moisture absorbing agent at a relative humidity of 95% in each of the moisture absorbing stage and the moisture releasing stage, the time required for the moisture absorption amount to reach 30% by weight in the moisture absorbing stage, the time required for the moisture releasing amount to reach 20% by weight in the moisture releasing stage, the difference in the moisture absorption amount in the hygroscopic isothermal line between the moisture absorbing agent at a relative humidity of 40% and the moisture absorbing agent at a relative humidity of 65% in the moisture absorbing stage, and the difference in the moisture releasing amount in the hygroscopic isothermal line between the moisture absorbing agent at a relative humidity of 50% and the moisture absorbing agent at a relative humidity of 20% in the moisture absorbing stage.

3 hours and is decreased in some cases because the saturated vapor pressure is increased with elevation of the temperature. Between 3 hours and 9 hours after start-up of one cycle, the internal humidity is increased because the environmental humidity is high. Further, between 9 hours and 12 hours

TABLE 1

|  | Moisture absorbing agent A | Moisture absorbing agent B | Moisture absorbing agent C | Moisture absorbing agent D | Moisture absorbing agent E | Moisture absorbing agent F |
|---|---|---|---|---|---|---|
| Difference in moisture absorption amount in moisture absorbing stage between moisture absorbing agent at humidity of 80% and moisture absorbing agent at humidity of 95% | 65 | 51 | 42 | 35 | 5 | 24 |
| Difference in moisture absorption amount in moisture releasing stage between moisture absorbing agent at humidity of 80% and moisture absorbing agent at humidity of 95% | 56 | 39 | 25 | 4 | 3 | 17 |
| Time required for 30% by weight of moisture absorption in moisture absorbing stage (min) | 53 | 65 | 81 | 95 | — | 130 |
| Time required for 20% by weight of moisture release in moisture releasing stage (min) | 51 | 63 | 84 | — | — | — |
| Difference in moisture absorption amount in moisture absorbing stage between moisture absorbing agent at humidity of 40% and moisture absorbing agent at humidity of 65% (wt %) | 8 | 7 | 6 | 11 | 34 | 6 |
| Difference in moisture releasing amount in moisture releasing stage between moisture absorbing agent at humidity of 50% and moisture absorbing agent at humidity of 20% (wt %) | 4 | 5 | 5 | 21 | 35 | 5 |

Use was made in each of these Examples was a magnetic disk apparatus sized at 2.5 inches. Also, each of the moisture absorbing agents A, B, C, D, E and F was housed in a respiration filter, which was attached to the back surface of a lid body. Any of silica and a mixture of silica and an activated char coal was used as the material of the moisture absorbing agent.

Example 1

A condensation preventing member was prepared by housing each of the moisture absorbing agents A, B and C in a gas permeable filter made of a material such as Gore-Tex. The condensation preventing member thus prepared was attached to the back surface of a lid body, and the lid body was disposed to cover a base body housing the constituting parts of the disk apparatus such as a magnetic disk sized at 2.5 inches. A temperature sensor and a humidity sensor were inserted into the clearance between the lid body and the base body so as to conduct a temperature-humidity cycle test in which one cycle consisted of heating and humidifying for 3 hours the air within the clearance noted above having a temperature of 25° C. and a relative humidity of 50% to an air having a temperature of 70% and a relative humidity of 90%, followed by cooling and dehumidifying the air for 3 hours to have a temperature of 25° C. and a relative humidity of 50% and subsequently maintaining the cooled and dehumidified state for 6 hours.

Figure 9:
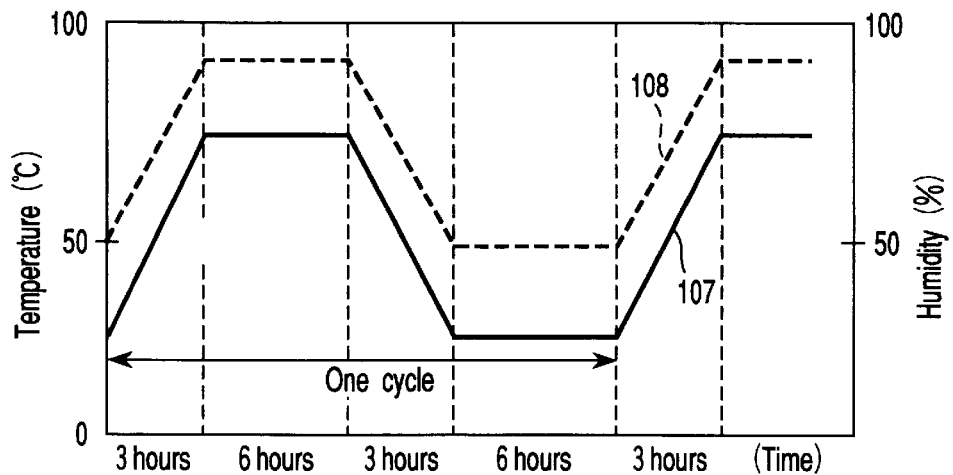
FIG. 9 is a graph showing the temperature and humidity conditions for one cycle in the first temperature and humidity cycle test.

FIG. 9 is a graph showing the humidity and temperature conditions employed in the temperature-humidity cycle test. Line 107 shown in FIG. 9 indicates temperature, with line 108 indicates humidity.

Figure 10:
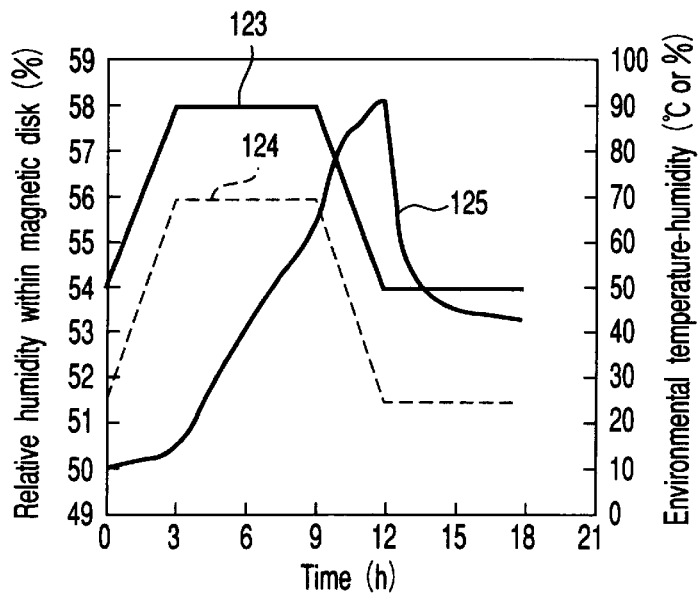
FIG. 10 is a graph showing the humidity within the apparatus in the first temperature and humidity cycle test.

Also, FIG. 10 is a graph showing the behavior of the humidity within the apparatus for one cycle, covering the case where the temperature-humidity cycle test was applied to the magnetic disk apparatus equipped with the moisture absorbing agent. Line 124 in FIG. 10 indicates the temperature, line 123 indicates humidity, and line 125 indicates internal humidity.

As shown in FIG. 10, in one cycle, the internal humidity (relative humidity) is not appreciably increased in the initial after start-up of one cycle, the saturated vapor pressure is lowered and the relative humidity is increased because the temperature is lowered. Still further, between 12 hours and 18 hours after start-up of one cycle, the humidity within the magnetic disk apparatus is lowered because the environmental humidity is lowered.

Incidentally, it has been confirmed that, since a rubbery gasket is arranged between the lid body and the base body, the air leakage between the lid body and the base body is negligibly small, compared with the flow of air through the air communicating hole.

The temperature-humidity cycle test described above was conducted 20 times for each of the cases.

Figure 11:
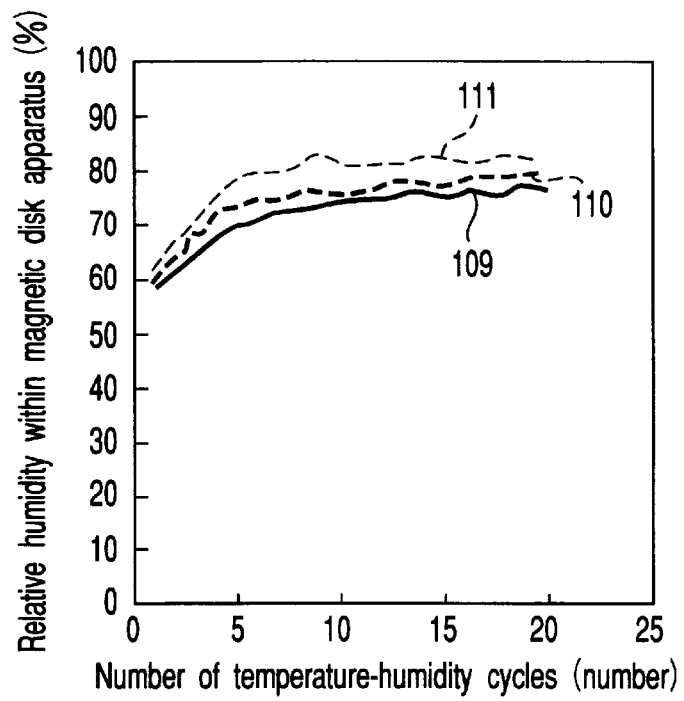
FIG. 11 is a graph in which are plotted the maximum values of the humidity within the magnetic disk apparatus in the temperature and humidity cycle test in Example 1.

The air amount within the magnetic disk apparatus was about 15 mL. FIG. 11 is a graph showing the maximum value of the humidity within the magnetic disk apparatus for each of the temperature-humidity cycles. Curves 109, 110 and 111 shown in FIG. 11 are directed to the moisture absorbing agents A, B and C, respectively.

As apparent from FIG. 11, the relative humidity was suppressed to a value not higher than 85% for each of the moisture absorbing agents A, B and C.

Comparative Example 1

A temperature-humidity cycle test similar to that conducted in Example 1 was conducted by using the moisture absorbing agents D, E and F.

Figure 12:
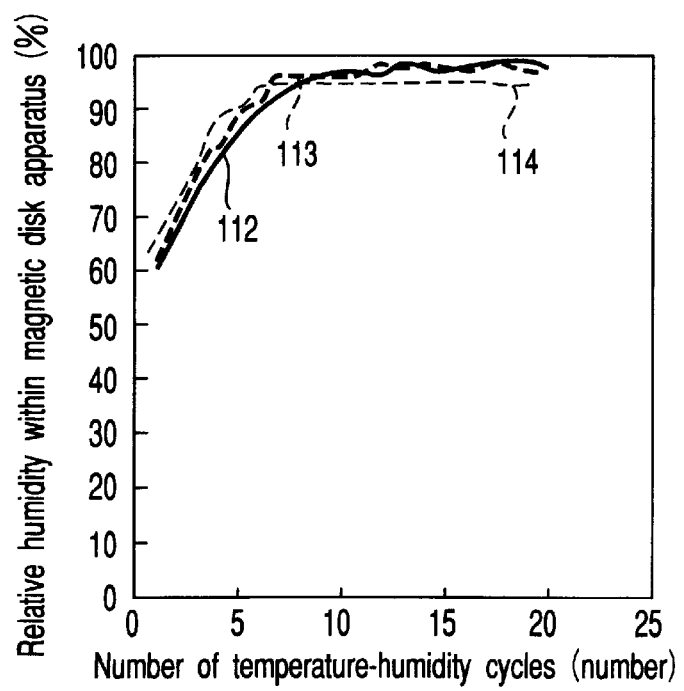
FIG. 12 is a graph in which are plotted the maximum values of the humidity within the magnetic disk apparatus in the temperature and humidity cycle test in Comparative Example 1.

FIG. 12 is a graph showing the maximum value of the humidity within the magnetic disk apparatus for each of the temperature-humidity cycle. Curves 112, 113 and 114 in FIG. 12 are directed to the moisture absorbing agents D, E and F, respectively.

As apparent from FIG. 12, the humidity is increased to exceed 95% for each of the moisture absorbing agents D, E and F, if the number of temperature-humidity cycles is increased.

Example 2 and Comparative Example 2

A temperature-humidity cycle test was conducted as in Example 1 by using a magnetic disk apparatus equivalent to that used in Example 1, except that the amount of each of the moisture absorbing agents A, B, C, D, E, and F contained in the condensation preventing members was changed within a range of between 30 mg and 90 mg. The maximum value of the relative humidity within the magnetic disk was measured in each of the temperature-humidity cycle test. Table 2 shows the results.

Figure 13:
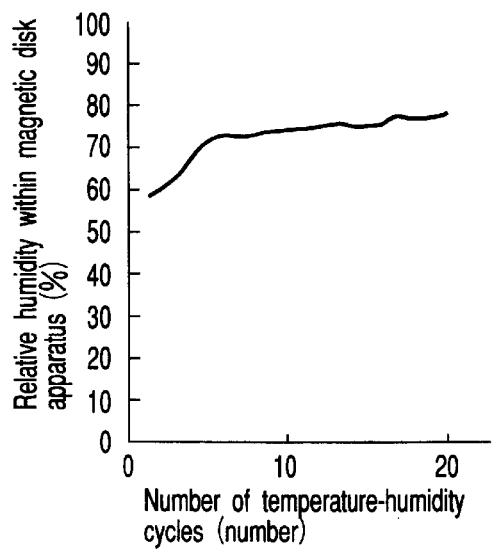
FIG. 13 is a graph in which are plotted the maximum values of the humidity within the magnetic disk apparatus in the first temperature and humidity cycle test in Example 3.

As apparent from FIG. 13, it was found that the highest humidity did not exceed 80%.

Also, a second temperature-humidity cycle test was conducted 20 times by using the a magnetic disk apparatus using a similar condensation preventing member. In this case, one cycle of the cycle test comprised heating and humidifying for 3 hours the air having a temperature 25° C. and a

TABLE 2

| | Highest relative humidity (%) within apparatus during temperature-humidity cycle test | | | | | |
|---|---|---|---|---|---|---|
| Amount of | Example 2 | | | Comparative Example 2 | | |
| moisture absorbing agent (mg) | Moisture absorbing agent A | Moisture absorbing agent B | Moisture absorbing agent C | Moisture absorbing agent D | Moisture absorbing agent E | Moisture absorbing agent F |
| 30 | 83 | 85 | 88 | 99 | 99 | 99 |
| 40 | 81 | 82 | 85 | 99 | 99 | 97 |
| 50 | 79 | 81 | 83 | 99 | 99 | 96 |
| 60 | 77 | 79 | 82 | 99 | 99 | 95 |
| 70 | 75 | 76 | 80 | 96 | 99 | 91 |
| 80 | 73 | 77 | 78 | 94 | 99 | 87 |
| 90 | 72 | 75 | 76 | 93 | 97 | 85 |

As shown in Table 2, it has been found possible to suppress the highest humidity to 80% or less by using 60 mg of each of the moisture absorbing agents A and B each exhibiting at least 50% of the difference in the moisture absorption amount in the moisture absorbing stage and at least 30% by weight of the difference in the moisture absorption amount in the moisture releasing step, and by using 70 mg of the moisture absorbing agent C exhibiting at least 30% by weight of the difference in the moisture absorption amount in the moisture absorbing stage and at least 20% by weight of the difference in the moisture absorption amount in the moisture releasing stage.

On the other hand, it was impossible to suppress the highest humidity to a level lower than 85% by using a large amount, i.e., 90 mg, of any of the moisture absorbing agents D, E and F each exhibiting less than 30% by weight of the difference in the moisture absorption amount in the moisture absorbing stage and less than 20% of the difference in the moisture absorption amount in the moisture releasing stage.

Examples 3 and 4

In Example 3, a magnetic disk apparatus using a condensation preventing member was prepared in which 40 mg of the moisture absorbing agent A and 20 mg of the moisture absorbing agent E were separately housed in a gas permeable filter. A temperature-humidity cycle equal to that in Example 1 was conducted 20 times by using the magnetic disk apparatus thus prepared. The difference in the moisture absorption amount in the hygroscopic isothermal line between the moisture absorbing agent E at a relative humidity of 40% and the moisture absorbing agent E at a relative humidity of 65% was found to be 34% in the moisture absorbing stage relative to the dry weight of the moisture absorbing agent, and the difference in the moisture absorption amount between the moisture absorbing agent E at a relative humidity of 20% and the moisture absorbing agent E at a relative humidity of 50% was found to be 35% in the moisture releasing stage relative to the dry weight of the moisture absorbing agent.

The highest value of the relative humidity within the magnetic disk in the temperature-humidity cycle test described above was measured. FIG. 13 is a graph showing the results.

humidity 50% to the air having a temperature of 60° C. and a relative humidity of 65%, maintaining the heated and humidified air as it was for 6 hours, dehumidifying the heated and dehumidified air for 3 hours to a dry air having a temperature of 60° C. and a relative humidity of 10%, maintaining the dehumidified air as it was for 6 hours, and humidifying the dehumidified air for 3 hours to an air having a temperature of 60° C. and a relative humidity of 65%.

Figure 14:
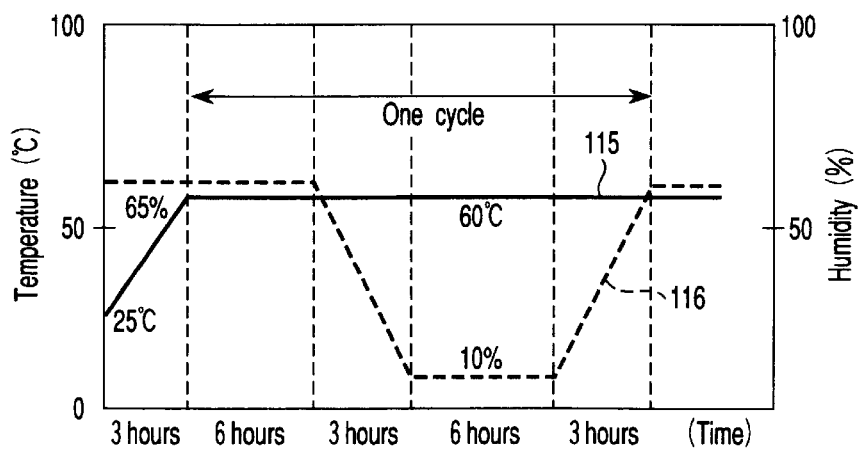
FIG. 14 is a graph showing the humidity and temperature conditions in the second temperature and humidity cycle test in Example 3.

FIG. 14 is a graph showing the humidity and temperature conditions in this temperature-humidity cycle test. Curve 115 shown in FIG. 14 indicates temperature, and curve 116 indicates humidity.

In Example 4, a magnetic disk was prepared equipped with a condensation preventing member housing the moisture absorbing agent A equivalent to that in Example 1, and the second temperature-humidity cycle test was conducted as in Example 3.

Figure 15:
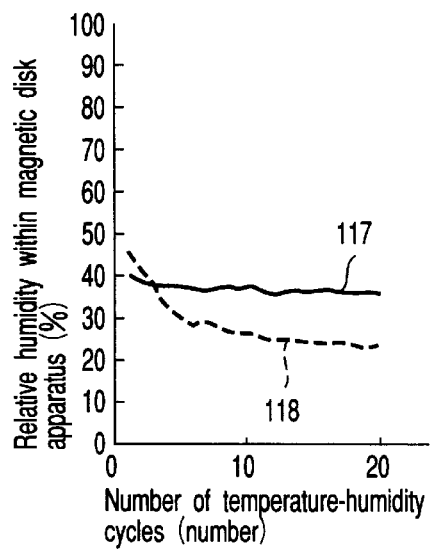
FIG. 15 is a graph in which are plotted the lowest values of the relative humidity within the magnetic disk apparatus in the temperature and humidity cycle test in Examples 3 and 4.

The lowest value of the relative humidity within the magnetic disk in the temperature-humidity cycle test was measured. FIG. 15 is a graph showing the results. Curves 117 and 118 shown in FIG. 15 denote Examples 3 and 4, respectively.

As shown in FIG. 15, it was found that the lowest humidity was maintained at a level not lower than 35% in Example 3. It was also found that the lowest humidity was lower than 25% in Example 4.

To reiterate, the difference in the moisture absorption amount between the moisture absorbing agent A at a relative humidity of 80% and the moisture absorbing agent A at a relative humidity of 95% is not less than 30% in the moisture absorbing stage and not less than 20% in the moisture releasing stage relative to the dry weight of the moisture absorbing agent. On the other hand, the difference in the moisture absorption amount between the moisture absorbing agent E at a relative humidity of 40% and the moisture absorbing agent E at a relative humidity of 65% is not less than 20% in the moisture absorbing stage relative to the dry weight of the moisture absorbing agent, and the difference in the moisture absorption amount between the moisture absorbing agent E at a relative humidity of 20% and the moisture absorbing agent E at a relative humidity of 50% is not less than 20% in the moisture releasing stage relative to the dry weight of the moisture absorbing agent. As apparent from comparison between Example 3 and Example 4, it has been found that the use of the moisture absorbing agent A noted above in combination with the moisture absorbing agent E is more effective than the use of the moisture absorbing agent A alone for controlling the highest humidity and the lowest humidity.

As apparent from Examples 1 to 4 described above, the present invention provides a disk apparatus capable of preventing malfunction caused by condensation and having high reliability through use of a moisture absorbing agent having a long life and capable of effectively suppressing change in the humidity within the disk apparatus.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk apparatus, comprising:
    a base body;
    a disk medium, a driving mechanism for supporting and rotating said disk medium, a head equipped with an element for reading information recorded on the disk medium, a carriage assembly supporting the head in a manner to be movable relative to the disk medium, and a condensation preventing member, which are placed on the base body; and
    a lid body covering the base body;
    wherein said condensation preventing member contains a moisture absorbing agent exhibiting a different moisture absorption amount depending on the humidity, the difference in said moisture absorption amount in its hygroscopic isothermal line between the moisture absorbing agent at a relative humidity of 80% and the moisture absorbing agent at a relative humidity of 95% being not less than 30% in the moisture absorbing stage and not less than 20% in the moisture releasing stage based on the dry weight of the moisture absorbing agent.

2. A disk apparatus according to claim 1, wherein said moisture absorbing agent includes at least first and second components each exhibiting a different moisture absorption amount depending on the humidity, the difference in said moisture absorption amount in its hygroscopic isothermal line between the first component of the moisture absorbing agent at a relative humidity of 80% and the first component of the moisture absorbing agent at a relative humidity of 95% is not less than 30% in the moisture absorbing stage and not less than 20% in the moisture releasing stage based on the dry weight of the first component of the moisture absorbing agent, and the difference in the moisture absorption amount in its hygroscopic isothermal line between the second component of the moisture absorbing agent at a relative humidity of 40% and the second component of the moisture absorbing agent at a relative humidity of 60% is not less than 20% in the moisture absorbing stage based on the dry weight of the second component of the moisture absorbing agent, and the difference in the moisture absorption amount between the second component of the moisture absorbing agent at a relative humidity of 20% and the second component of the moisture absorbing agent at a relative humidity of 50% is not less than 20% in the moisture releasing stage based on the dry weight of the second component of the moisture absorbing agent.

3. A disk apparatus according to claim 2, wherein the weight ratio of the first moisture absorbing agent to the second moisture absorbing agent falls within a range of between 3:1 and 1:3.

4. A disk apparatus according to claim 1, wherein the difference in the moisture absorption amount between the moisture absorbing agent at a relative humidity of 80% and the moisture absorbing agent at a relative humidity of 95% is not less than 50% in the moisture absorbing stage and is not less than 30% in the moisture releasing stage.

5. A disk apparatus according to claim 1, wherein the head is a floating type head.

6. A disk apparatus according to claim 1, wherein the moisture absorbing agent is one of silica and a mixture of silica and activated charcoal.

7. A disk apparatus according to claim 1, wherein the condensation preventing member is mounted on at least one of the inside of the base body and the back surface of the lid body.

8. A disk apparatus according to claim 1, wherein the condensation preventing member includes at least a moisture absorbing agent and a gas permeable film housing the moisture absorbing agent.

* * * * *